(12) United States Patent
Maki et al.

(10) Patent No.: US 6,677,829 B2
(45) Date of Patent: Jan. 13, 2004

(54) BALANCED TRANSMISSION TERMINATION DEVICE AND RECEIVER UNIT COMPOSED THEREOF

(75) Inventors: Masahiro Maki, Iizuka (JP); Yuji Igata, Tukushino (JP); Satoshi Hasako, Iizuka (JP); Junji Kondou, Fukuoka-Ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/086,185

(22) Filed: Feb. 27, 2002

(65) Prior Publication Data
US 2002/0145485 A1 Oct. 10, 2002

(30) Foreign Application Priority Data
Feb. 28, 2001 (JP) .......................... 2001-054226

(51) Int. Cl.$^7$ .............. H01P 1/26; H03H 7/38; H03H 5/00
(52) U.S. Cl. ............... 333/22 R; 333/32; 333/25
(58) Field of Search ............... 333/22 R, 25, 333/32

(56) References Cited

U.S. PATENT DOCUMENTS

| 4,283,604 A | * | 8/1981 | Chambers, Jr. ............... 379/413 |
| 5,061,913 A | * | 10/1991 | Okochi et al. ............... 333/181 |
| 5,179,362 A | | 1/1993 | Okochi et al. |
| 5,659,273 A | * | 8/1997 | Harpham ............... 333/22 R |
| 6,150,896 A | * | 11/2000 | DeCramer et al. ............... 333/25 |

FOREIGN PATENT DOCUMENTS

JP 3033424 9/1995

OTHER PUBLICATIONS

English Translation of JP 3033424, published on Sep. 12, 1995.

* cited by examiner

*Primary Examiner*—Patricia Nguyen
(74) *Attorney, Agent, or Firm*—Darby & Darby

(57) ABSTRACT

Impedance values of a common mode choke coil, an impedance element disposed anterior to the common mode choke coil and an impedance element disposed posterior to the common mode choke coil are determined in such a manner that a common mode current flowing into the common mode choke coil does not exceed a value of rated current. Excessive common mode current is prevented from flowing into the common mode choke coil, and saturation and damage of the common mode choke coil is prevented.

8 Claims, 5 Drawing Sheets

Fig. 5 (a) Prior Art
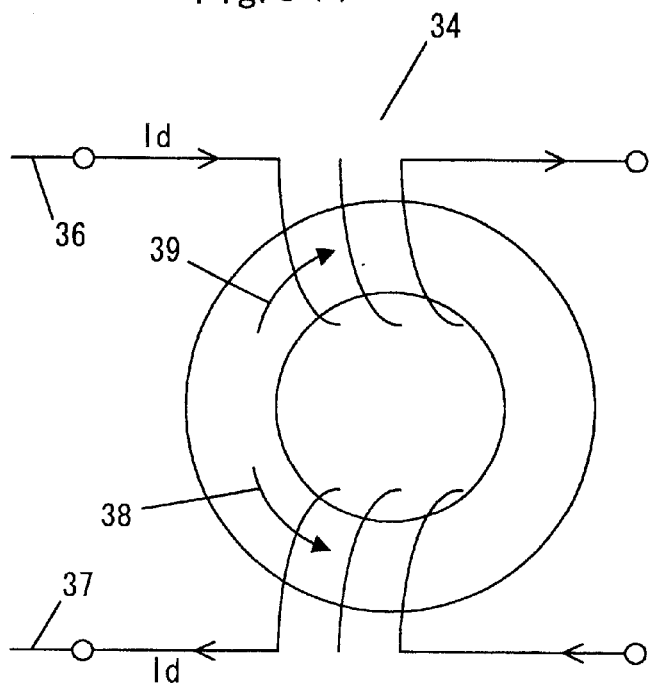
Fig. 5 (b) Prior Art
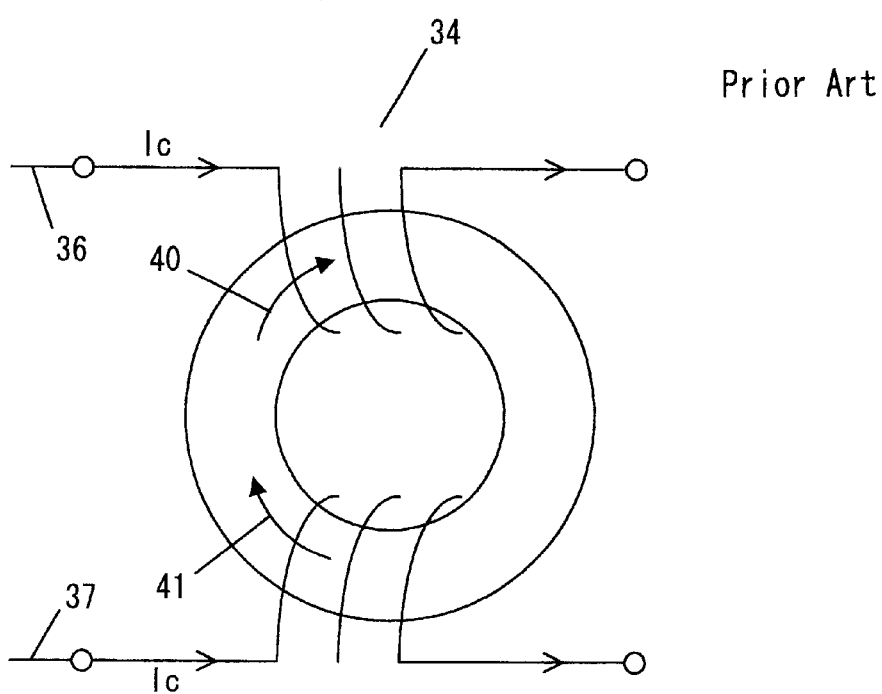

BALANCED TRANSMISSION TERMINATION DEVICE AND RECEIVER UNIT COMPOSED THEREOF

BACKGROUND OF THE INVENTION

1. Field of the Invention

The present invention relates to a balanced transmission termination device comprising a common mode choke coil for restraining common mode noise in a balanced transmission system in which a paired cable is employed, and to a receiver unit composed of such a device.

2. Description of the Related Art

Referring to FIG. 4, a balanced transmission system with a conventionally balanced transmission termination device includes a transmitter unit 30 and a receiver unit 31. Transmitter unit 30 and receiver unit 31 carry out communications through balanced transmission line 32 consisting of a pair of leads 36 and 37.

Receiver unit 31 contains a conventionally balanced transmission termination device 42 and a main body circuit 33. Balanced transmission termination device 42, connected at the termination of balanced transmission line 32, is made up of a common mode choke coil 34 and an impedance element R.

Common mode choke coil 34 attenuates common mode noise that has been mixed into the desired signal on balanced transmission line 32. Details of this operation are described hereunder.

Referring now to FIG. 5(a), when a current Id flowing through the pair of leads 36 and 37 is of an opposite phase (differential mode), the respective magnetic fluxes 38 and 39 generated by the current are equal and opposite, and thus are mutually erased. Therefore, common mode choke coil 34 does not influence the transmission signals.

Referring now to FIG. 5(b), when a current Ic flowing through the pair of leads 36 and 37 is in-phase (common mode), magnetic fluxes 40 and 41 add together, instead of cancelling. This increases the apparent impedance of common mode choke coil 34 to common mode currents, without affecting the out-of-phase differential currents.

As a result of the foregoing, common mode choke coil 34 attenuates only the common mode current (common mode noise) Ic that has been mixed as noise, without affecting differential mode current (differential signal) Id, which is the object to be transmitted.

Japanese Unexamined Patent No.Hei-7-240652 also discloses a related prior art. This prior art is related to a balanced-to-unbalanced transducer comprising a transformer (corresponding to a common mode choke coil).

Common mode choke coil 34 utilizes the effect of the magnetic fluxes generated by a current flowing through the coil. Therefore, when an excessive amount of common mode current Ic flows through common mode choke coil 34, the core of common mode choke coil 34 becomes saturated. Saturation disturbs the effective performance of common mode choke coil 34. Also, an excessive amount of common mode current Ic may damage thin coils having a small diameter.

Especially when the aforementioned balanced transmission system is employed in a moving vehicle such as automobile or aircraft, the system is prone to cause the mentioned problems since the engine in an automobile or aircraft generates a large amount of common mode electrical noise. In addition, such a moving vehicle as stated above often passes in proximity to a radio transmitter tower or a high-tension cable. These sources are also capable of causing common mode problems.

OBJECTS AND SUMMARY OF THE INVENTION

In view of the foregoing, an object of the present invention is to provide a balanced transmission termination device that can restrain saturation of a common mode choke coil and prevent damage thereof and a receiver unit using such a balanced transmission termination device.

The first aspect of the invention provides a balanced transmission termination device at the termination of a balanced transmission line consisting of a pair of leads, comprising: two primary impedance elements connected in series between the pair of leads with a nodal point therebetween that is grounded; a common mode choke coil disposed posterior to the primary impedance elements for attenuating a common mode noise generated in the balanced transmission line; a secondary impedance element disposed posterior to the common mode choke coil for impedance matching with the primary impedance elements; wherein the primary impedance elements have an impedance that can maintain balanced transmission in a differential mode; the primary and secondary impedance elements have an impedance that allows impedance matching with a characteristic impedance of the balanced transmission line; and the impedance of the common mode choke coil, primary impedance elements and a secondary impedance element are determined in such a manner that a common mode current flowing into the common mode choke coil will not exceed a predetermined value.

By such a construction, excessive common mode current is prevented from flowing into the common mode choke coil. As a result, saturation and damage of the common mode choke coil is prevented even in the presence of an excessive common mode current in the balanced transmission line.

The second aspect of the invention provides a balanced transmission termination device according to the first aspect, wherein each of the primary impedance elements is a resistance element.

By such a construction, a balanced transmission termination device that can prevent the saturation and damage of the common mode choke coil is easily obtained.

The third aspect of the invention provides a receiver unit provided with a balanced transmission termination device according to the first aspect.

By such a construction, an excessive common mode current is prevented from flowing into the common mode choke coil, and saturation and damage of the common mode choke coil is prevented. As a result, the performance of the common mode choke coil is maintained, and influence of common mode noise is minimized even when an excessive common mode current is generated in the balanced transmission line.

The fourth aspect of the invention provides a receiver unit, in addition to the third aspect, wherein each of the primary impedance elements disposed in the balanced transmission termination device is a resistance element. By such a construction, a receiver unit that minimizes the influence of common mode noise is easily obtained.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5(a) is an explanatory drawing of a common mode choke coil in differential transmission.

FIG. 5(b) is an explanatory drawing of a common mode choke coil in in-phase transmission.

DETAILED DESCRIPTION OF THE PREFERRED EMBODIMENTS

Figure 1:
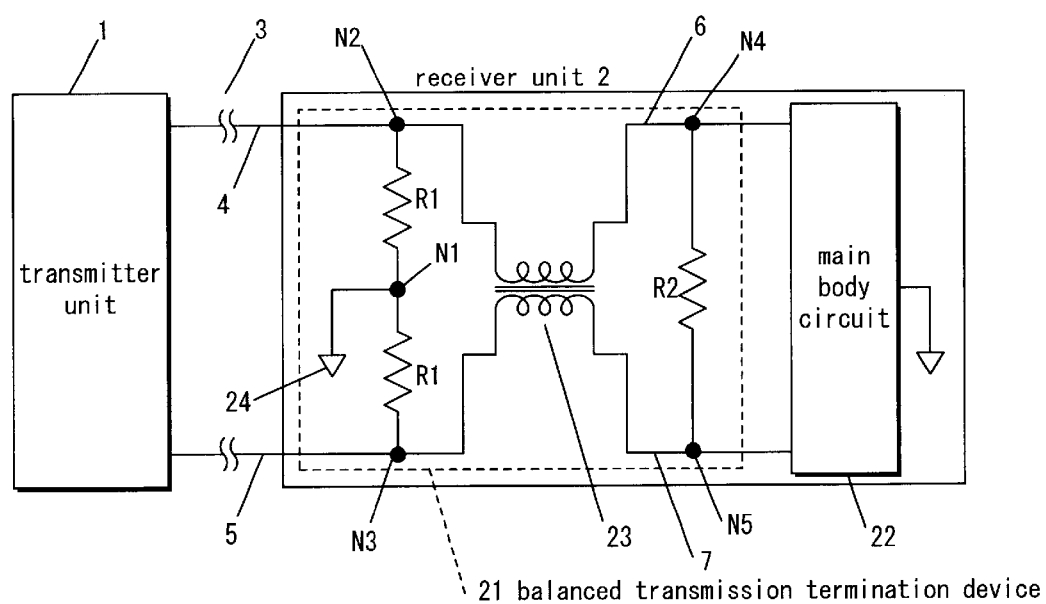
FIG. 1 is a block diagram of a balanced transmission system according to the embodiment of the present invention.

Referring to FIG. 1, a balanced transmission system according to the embodiment of the invention includes a transmitter unit 1 and a receiver unit 2. Transmitter unit 1 and receiver unit 2 communicate over a balanced transmission line 3 consisting of a pair of leads 4 and 5.

Receiver unit 2 contains a balanced transmission termination device 21 and a main body circuit 22. Balanced transmission termination device 21 is connected at the termination of balanced transmission line 3. Balanced transmission termination device 21 includes two impedance elements R1, a common mode choke coil 23 and an impedance element R2. Impedance elements R1 and R2 are preferably resistance elements (resistors).

The connection relationships are as follows. The two impedance elements R1, of balanced transmission termination device 21, are connected in series between lead 4 and lead 5. A nodal point N1, where one of the impedance elements R1 is connected with the other impedance element R1, is connected to a ground 24. Impedance element R2 is connected between lead 6 and lead 7.

An end of one of the windings of common mode choke coil 23 is connected to nodal point N2 where impedance element R1 and lead 4 are connected. The other end of common mode choke coil 23 is connected to nodal point N4 where impedance element R2 and lead 6 are connected. Likewise, an end of the other winding of common mode choke coil 23 is connected to nodal point N3 where impedance element R1 and lead 5 are connected. The other end of common mode choke coil 23 is connected to nodal point N5 where impedance element R2 and lead 7 are connected.

Accordingly, common mode choke coil 23 is disposed downstream of two impedance elements R1. Impedance element R2 is disposed downstream of common mode choke coil 23.

Each of the mentioned components functions and operates as follows. The construction, function and operation of common mode choke coil 23 is similar to those of common mode choke coil 34 shown in FIG. 5. Also, main body circuit 22 of receiver unit 2 receives signals transmitted by transmitter unit 1 through balanced transmission termination device 21 and executes the prescribed process.

The function of maintaining balanced transmission in differential mode (differential transmission) is described as follows.

The impedance of impedance element R1 connected to lead 4 and that of impedance element R1 connected to lead 5 are set at substantially the same value. Because of such a setting balanced transmission in differential mode is maintained.

Figure 2:
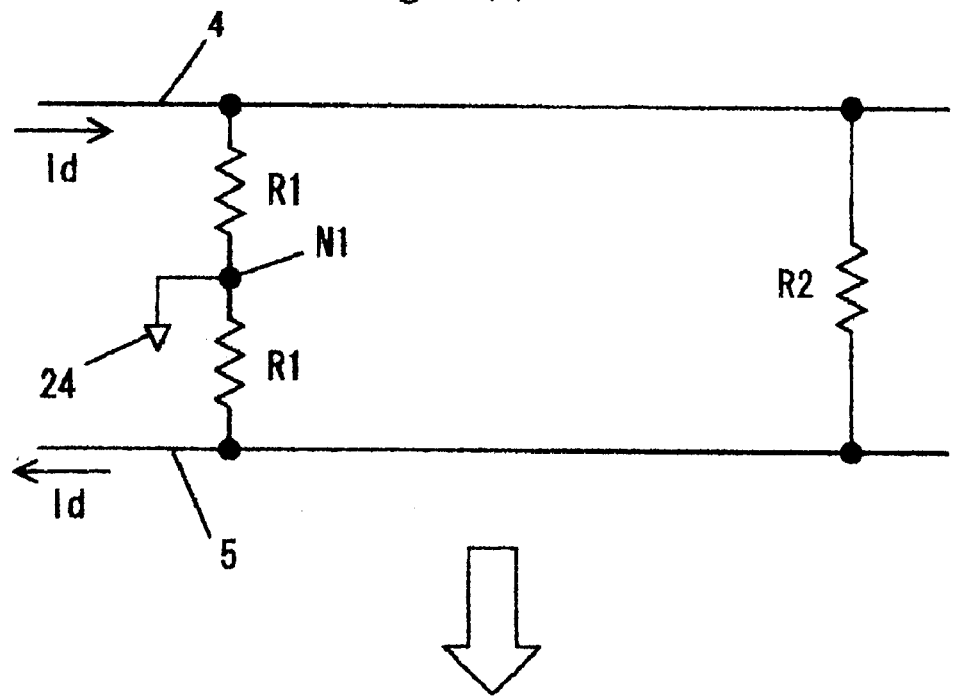
FIG. 2(a) is an explanatory drawing to which reference will be made in explaining an operation in a differential transmission.
FIG. 2(b) is an explanatory drawing to which reference will be made in explaining another operation in a differential transmission.
Figure 2:
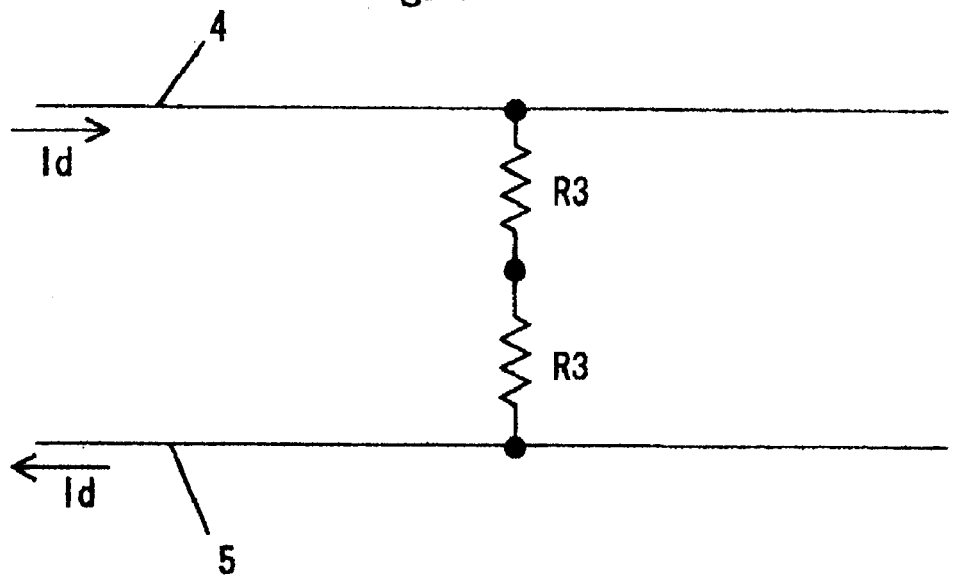

Now referring to FIG. 2(a), the circuit diagram of balanced transmission termination device 21 of FIG. 1 is shown. FIG. 2(b) shows the equivalent circuit of the actual circuit of FIG. 2(a).

Similarly to the construction of FIG. 5(a), the impedance of common mode choke coil 23 is close to zero in the differential mode.

Therefore, since common mode choke coil 23 scarcely influences the differential mode, balanced transmission termination device 21 becomes equivalent to the circuit shown in FIG. 2(a).

Further, the circuit of FIG. 2(a) is equivalent to that of FIG. 2(b). More specifically, the circuit of FIG. 2(a) is equivalent to that of FIG. 2(b) consisting of two impedance elements R3 connected in series between lead 4 and lead 5.

Here, when "R1" stands for impedance of impedance element R1, "R2" for that of impedance element R2 and "R3" for that of impedance element R3, the following formula is established.

$$R3 = \frac{R1 \times \frac{R2}{2}}{R1 + \frac{R2}{2}} \quad \text{[Formula 1]}$$

This formula shows that R3 is a composite impedance of R1 and R2/2. Therefore, it is preferable to determine values of R1 and R2 in such a manner that R3 becomes substantially the same value as Zo/2 where the characteristic impedance of balanced transmission line 3 is denoted as "Zo"

As a result of such a setting, impedance matching is performed, and correct matching is achieved for a differential mode current (differential signal) Id. Consequently, the function as a termination device is secured.

Figure 3:
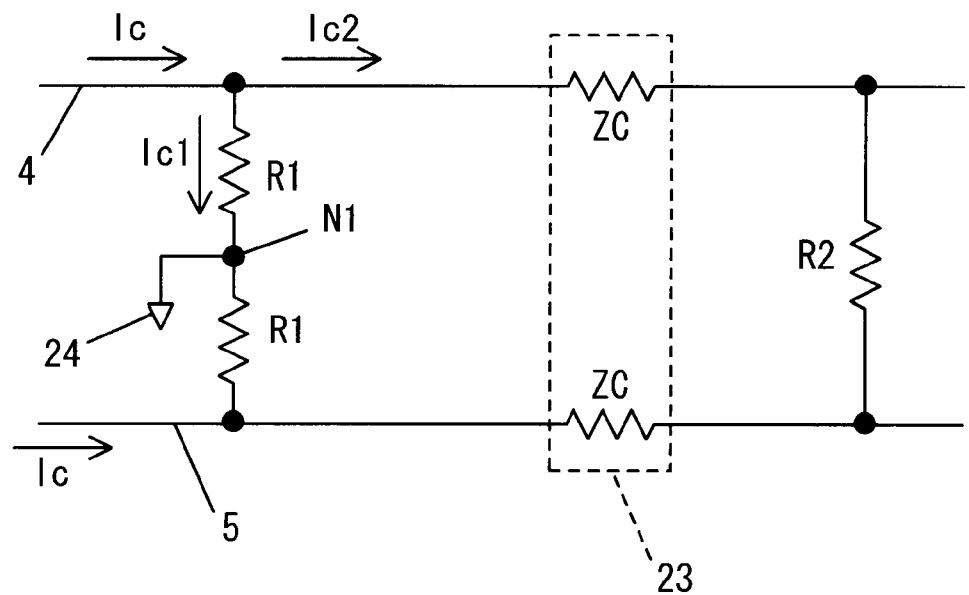
FIG. 3 is an explanatory drawing to which reference will be made in explaining an operation in an in-phase transmission.
Figure 4:
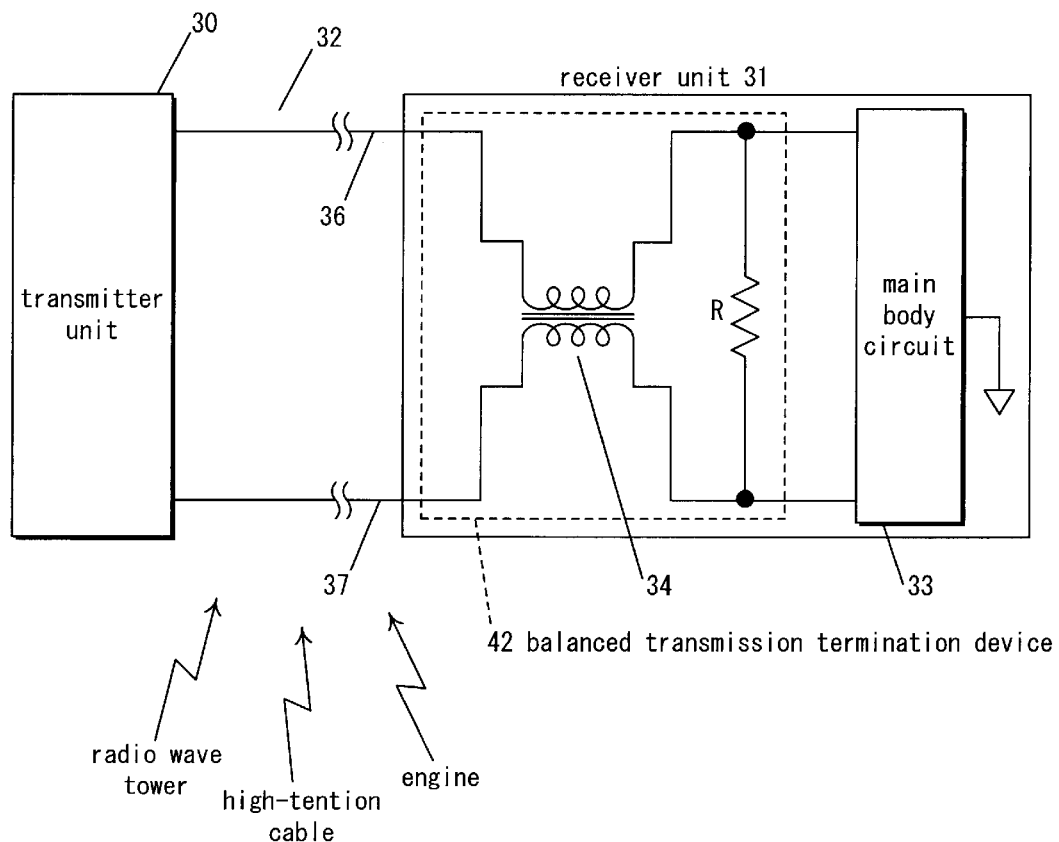
FIG. 4 is a block diagram of a conventionally balanced transmission system

Referring to FIG. 3, the function in common mode (in-phase transmission) will now be described hereunder. FIG. 3 is a circuit diagram equivalent to balanced transmission termination device 21 of FIG. 1, in common mode.

A common mode current Ic generated by common mode noise, that has intruded from outside, flows as in-phase current through a pair of leads 4 and 5. As a result, impedance of common mode choke coil 23 is greater since magnetic flux participates as in the case of FIG. 5(b).

In the common mode, therefore, balanced transmission termination device 21 is equivalent to the circuit of FIG. 3. In FIG. 3, "ZC" stands for the impedance of a winding that constitutes common mode choke coil 23.

A flow of common mode current Ic, generated in balanced transmission line 3, is divided into current Ic1 and current Ic2, by R1 and composite impedance of R2 and ZC, as shown in FIG. 3.

It is preferable to determine values of R1 and R2 and Zc in such a manner that a value of current Ic2 flowing into common mode choke coil 23 does not exceed a value of rated current Ir (a predetermined value) of common mode choke coil 23. Such setting will be described in further detail hereunder.

Current Ic2 flowing into common mode choke coil 23 is in the following Formula 2, according to which values of R1 and R2 and ZC are determined so that a value of current Ic2 does not exceed a value of rated current Ir.

$$Ir \geq Ic2 = \frac{R1}{R1 + ZC + \frac{R2}{2}} \times Ic \qquad \text{[Formula 2]}$$

An example of steps for setting values of R1 and R2 and ZC according to [Formula 2] is given below. An assumed value of common mode current Ic that is likely to intrude into balanced transmission line 3 is substituted for "Ic" in [Formula 2]. For this operation, the following phenomena are generally taken into consideration.

Under a strong electric field, a common mode voltage of several tens of V (volts) is induced. In a transmission medium that has a characteristic impedance of tens to hundreds of $\Omega$, a common mode current of hundreds of mA (milliampere) to several A (amperes) are generated.

Accordingly, based on the foregoing it is preferable to give "Ic" of [Formula 2] a value of hundreds mA to several A.

"ZC" of [Formula 2] is substituted with impedance ZC of common mode choke coil 23 for use. An impedance value obtained when a current of a certain frequency is applied to common mode choke coil 23 is adopted as impedance ZC of common mode choke coil 23.

Also, common mode choke coils are generally designed taking the characteristic impedance of a transmission medium into consideration. For example, when the characteristic impedance of a transmission medium is tens to hundreds of $\Omega$ as above, an entire common mode choke coil is designed to have an impedance that exceeds the characteristic impedance of the transmission medium, for instance hundreds of $\Omega$ to several k$\Omega$. In such a case, "Zc" of [Formula 2] is assigned a value of (hundreds of $\Omega$ several k$\Omega$)/2.

Then values of "R1" and "R2" in [Formula 2] are determined in such a manner that a value of current Ic2 does not exceed the value of rated current Ir.

By the foregoing arrangement, an overcurrent Ic2 that exceeds a rated current Ir of common mode choke coil 23 is prevented from flowing into common mode choke coil 23. In other words, an overcurrent Ic2 that could otherwise saturate the core or damage the winding is prevented from flowing into common mode choke coil 23.

Here, rated current Ir corresponds to a current level above which a common mode choke coil will be saturated and will no longer be able to effectively perform its function.

Usually a rated current of a common mode choke coil is specified by the manufacturer of the common mode choke coil. However, "rated current Ir" herein referred to does not necessarily have to correspond with the rated current specified by the manufacturer.

In common mode, a voltage outputted to main body circuit 22 is divided into ZC and R2, and an influence of common mode noise is further limited in the condition of ZC>>R2.

Meanwhile, common mode current Ic1 is dissipated in impedance element R1.

According to the aforementioned embodiment of the invention, the impedances of two impedance elements R1 are set at substantially the same value, and the impedance of R3 that is a composite impedance of R1 and R2/2 is set at substantially the same value as Zo/2.

As a result, balanced transmission is maintained in differential mode and impedance matching is performed. Also, in addition to securing such functions as a termination device for maintaining balanced transmission, the following advantages are attained.

According to this embodiment, the impedances of common mode choke coil 23, impedance elements R1 and impedance element R2 are determined in such a manner that common mode current Ic2 flowing into common mode choke coil 23 does not exceed a rated current value Ir (a predetermined value).

By such an arrangement, an excessive common mode current is prevented from flowing into common mode choke coil 23. Therefore, saturation and damage of the common mode choke coil 23 is prevented even when an excessive common mode current is generated in balanced transmission line 3.

As a result, common mode choke coil 23 can effectively perform its function of attenuating common mode noise even when an excessive common mode current is generated in balanced transmission line 3. Also, influence of common mode noise to main body circuit 22 in receiver unit 2 is minimized.

Further, according to this embodiment, each of the impedance elements R1 is a resistance element. By such a construction, a balanced transmission termination device 21 that prevents saturation and damage of common mode choke coil 23 is easily obtained.

Hereunder, differences between this embodiment and the prior art disclosed in the aforementioned Japanese Unexamined Patent No. Hei-7-240652 will be described. This prior art is related to a balanced-to-unbalanced transducer comprising a transformer (corresponding to a common mode choke coil).

According to the prior art, common mode noise is grounded through an impedance element disposed between signal lines on the balanced side, for preventing influence of common node noise.

Accordingly, the prior art is not intended for attenuating common mode noise using a transformer.

Therefore, the prior art cannot be associated with such an object as preventing saturation of a transformer by restraining the flow of common mode current into the transformer.

Consequently, it is natural that no countermeasure for restraining the flow of common mode current into the transformer is referred to in the prior art.

More specifically, no disclosure is made regarding the method for establishing correlations among impedances of the transformer, that of an impedance element disposed anterior to the transformer and that of an impedance element disposed posterior to the transformer.

In view of the foregoing, it is to be understood that the embodiment of the present invention and the prior art have quite different objects, functions and effects.

In addition, although resistance elements are used as impedance elements R1 and R2 in FIG. 1, various other types of impedance devices, including capacitors and inductors, or a combination thereof with resistors can also be employed instead, without limiting resistance elements.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A balanced transmission termination device for termination of a balanced transmission line consisting of a pair of leads, comprising:
   two primary impedance elements connected in series between said pair of leads;
   a nodal point between said two primary impedance element is grounded;
   a common mode choke coil disposed downstream of said primary impedance elements for attenuating a common mode noise generated in said balanced transmission line;
   a secondary impedance element disposed downstream of said common mode choke coil for impedance matching with said primary impedance elements;
   said primary impedance elements have an impedance effective to maintain balanced transmission in differential mode;
   said primary and secondary impedance elements have an impedance effective to allow impedance matching with a characteristic impedance of said balanced transmission line; and
   an impedance of said common mode choke coil, primary impedance elements and secondary impedance element prevent a common mode current flowing into said common mode choke coil from exceeding a predetermined value.

2. The balanced transmission termination device according to claim 1, wherein:
   impedances of said two primary impedance elements are substantially equal value; and values of "R1", "R2" and "ZC" are determined so as to satisfy $$\frac{Zo}{2} = \frac{R1 \times \frac{R2}{2}}{R1 + \frac{R2}{2}}$$

$$Ir \geq \frac{R1}{R1 + ZC + \frac{R2}{2}} \times Ic$$

wherein "Zo" stands for the characteristic impedance of said balanced transmission line, "R1" stands for the impedance of said primary impedance element, "R2" stands for the impedance of said secondary impedance element, "ZC" stands for the impedance of one of the windings of said common mode choke coil, "Ic" stands for an assumed value of common mode current, and "Ir" stands for a predetermined value that is in accordance with a rated current value of said common mode choke coil.

3. The balanced transmission termination device according to claim 1, wherein each of said primary impedance elements is a resistance element.

4. The balanced transmission termination device according to claim 2, wherein each of said primary impedance elements is a resistance element.

5. A receiver unit having a balanced transmission termination device according to claim 1.

6. A receiver unit according to clam 5, wherein said balanced transmission termination device includes:
   impedances of said two primary impedance elements are of substantially the same value; and
   values of "R1", "R2" and "ZC" are determined so as to satisfy $$\frac{Zo}{2} = \frac{R1 \times \frac{R2}{2}}{R1 + \frac{R2}{2}}$$

$$Ir \geq \frac{R1}{R1 + ZC + \frac{R2}{2}} \times Ic$$

wherein "Zo" stands for the characteristic impedance of said balanced transmission line, "R1" stands for the impedance of said primary impedance element, "R1" stands for the impedance of said secondary impedance element, "ZC" stands for the impedance of one of the windings of said common mode choke coil, "Ic" stands for an assumed value of common mode current, and "Ir" stands for a predetermined value that is in accordance with a rated current value of said common mode choke coil.

7. A receiver unit according to claim 5, wherein each of said primary impedance elements in said balanced transmission termination device is a resistance element.

8. The receiver unit according to claim 6, wherein each of said primary impedance elements disposed in said balanced transmission termination device is a resistance element.

* * * * *

UNITED STATES PATENT AND TRADEMARK OFFICE
CERTIFICATE OF CORRECTION

PATENT NO.    : 6,677,829 B2
DATED         : January 13, 2004
INVENTOR(S)   : Masahiro Maki et al.

It is certified that error appears in the above-identified patent and that said Letters Patent is hereby corrected as shown below:

Column 8,
Line 33, delete "R1" and insert -- R2 --.

Signed and Sealed this

Twenty-fourth Day of January, 2006

JON W. DUDAS
*Director of the United States Patent and Trademark Office*